(12) United States Patent
Keller et al.

(10) Patent No.: US 8,595,716 B2
(45) Date of Patent: Nov. 26, 2013

(54) FAILSAFE FIRMWARE UPDATES

(75) Inventors: Brent Keller, Rochester, NY (US); John Sotack, Rochester, NY (US); Alan Hayter, Victor, NY (US)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 13/081,274

(22) Filed: Apr. 6, 2011

(65) Prior Publication Data

US 2012/0260244 A1 Oct. 11, 2012

(51) Int. Cl.
*G06F 9/445* (2006.01)

(52) U.S. Cl.
USPC ........... 717/171; 717/168; 717/170; 717/174; 717/176

(58) Field of Classification Search
None
See application file for complete search history.

(56) References Cited

U.S. PATENT DOCUMENTS

| | | | |
|---|---|---|---|
| 5,210,854 A | 5/1993 | Beaverton et al. | |
| 5,568,641 A | 10/1996 | Nelson et al. | |
| 5,579,522 A | 11/1996 | Christeson et al. | |
| 5,701,492 A | 12/1997 | Wadsworth et al. | |
| 5,737,585 A | 4/1998 | Kaneshima | |
| 6,308,265 B1 | 10/2001 | Miller | |
| 6,442,067 B1 | 8/2002 | Chawla et al. | |
| 6,486,883 B1 | 11/2002 | Mathur | |
| 6,560,701 B1 | 5/2003 | Berstis et al. | |
| 6,584,559 B1 | 6/2003 | Huh et al. | |
| 6,622,246 B1 | 9/2003 | Biondi | |
| 6,640,334 B1 | 10/2003 | Rasmussen | |
| 6,708,231 B1 | 3/2004 | Kitagawa | |
| 6,789,158 B2 | 9/2004 | Takahashi | |
| 7,797,693 B1 | 9/2010 | Gustafson et al. | |
| 7,971,199 B1* | 6/2011 | Chen .............................. | 717/168 |
| 8,196,130 B2* | 6/2012 | Chen et al. .................... | 717/168 |
| 2003/0066062 A1* | 4/2003 | Brannock et al. ............. | 717/169 |
| 2003/0182414 A1* | 9/2003 | O'Neill ......................... | 717/223 |
| 2004/0093597 A1 | 5/2004 | Rao et al. | |
| 2004/0215755 A1* | 10/2004 | O'Neill ......................... | 709/223 |
| 2005/0055595 A1 | 3/2005 | Frazer et al. | |
| 2005/0097540 A1* | 5/2005 | Matsumoto et al. .......... | 717/168 |

(Continued)

FOREIGN PATENT DOCUMENTS

| | | |
|---|---|---|
| EP | 1624373 | 2/2006 |
| WO | 2008038063 | 4/2008 |

(Continued)

OTHER PUBLICATIONS

International Search Report and Written Opinion for Application No. PCT/US2012/032453 dated Jun. 28, 2012 (13 pages).

*Primary Examiner* — Isaac Tecklu
(74) *Attorney, Agent, or Firm* — Michael Best & Friedrich LLP

(57) ABSTRACT

A method of updating an electronic device. The device has a non-volatile memory divided into at least three non-overlapping sections, a bootstrap image section, a updater image section, and a application image section. The method includes erasing the application image section of the non-volatile memory, receiving a firmware update, writing the firmware update into the application image section, rebooting the electronic device, determining one of an application program and an updater program resides in the application image section, executing the application program when the application program is determined to reside in the application image section, erasing the updater image section of the non-volatile memory when the updater program is determined to reside in the application image section, and moving the updater program from the application image section to the updater image section.

15 Claims, 6 Drawing Sheets

(56) References Cited

U.S. PATENT DOCUMENTS

| | | |
|---|---|---|
| 2005/0114852 A1* | 5/2005 | Chen et al. .................... 717/168 |
| 2006/0130046 A1 | 6/2006 | O'Neill |
| 2006/0136676 A1 | 6/2006 | Park et al. |
| 2006/0259207 A1 | 11/2006 | Natsume |
| 2008/0040818 A1 | 2/2008 | Iima et al. |
| 2009/0222650 A1 | 9/2009 | Chen |
| 2009/0320012 A1* | 12/2009 | Lee et al. ..................... 717/168 |
| 2010/0031246 A1* | 2/2010 | Meller et al. ................. 717/173 |
| 2010/0180108 A1 | 7/2010 | Liu |
| 2010/0257345 A1 | 10/2010 | Tazzari et al. |
| 2011/0167419 A1* | 7/2011 | Ishikawa ...................... 717/171 |
| 2012/0079474 A1* | 3/2012 | Gold et al. .................... 717/173 |

FOREIGN PATENT DOCUMENTS

| | | |
|---|---|---|
| WO | 2008045044 | 4/2008 |
| WO | 2009116195 | 9/2009 |
| WO | 2010052647 | 5/2010 |

* cited by examiner

FAILSAFE FIRMWARE UPDATES

BACKGROUND

The invention relates to updating firmware in embedded devices. Specifically, the invention relates to failsafe systems and methods for updating firmware in embedded devices with a minimal memory footprint.

An embedded device is a computer system where all necessary hardware and mechanical components to achieve a specific purpose are integrated into a dedicated hardware assembly. The executable code in an embedded system is referred to as "firmware." The firmware is written to non-volatile storage, such as flash storage or other block-based, electrically erasable, programmable random access memory (EEPROM) technology.

It is common practice to update the firmware in these devices in the field without using any special hardware. The firmware is either read from a removable media or received over a communication path from another microprocessor-based system.

The act of updating firmware in an embedded device involves the embedded device erasing a block of storage, and then writing that storage with replacement firmware. A block can store a significant portion of the overall executable firmware. The replacement firmware is read from a removable media or a communication stream from an external system.

During the update process, if power is removed or communication with the external system or removable media is lost, the device is left without valid firmware, and therefore may be in an unusable state. As a consequence, the device needs to be returned to a service center, or discarded.

There are two commonly used approaches to prevent the problem of devices being rendered unusable by failures during firmware update. The first approach is to buffer the received firmware in another memory, such as random-access memory (RAM). This image can then be verified prior to erasing the existing firmware. Although this protects against an interruption of the firmware stream to the device, this approach is not fully failsafe. Any power loss from the time the device has erased its previous firmware until it has completed writing the new firmware would leave the device unusable. This approach also requires a large enough external buffer to receive and verify the firmware, making it undesirable in cost sensitive applications.

The second approach is to maintain a fully redundant firmware copy. The original firmware is only erased after the new firmware is verified to be correctly programmed. This approach can be made fully failsafe, but requires the device to have approximately twice the amount of storage that would be required over the first approach. This is unacceptable in cost sensitive or storage constrained systems.

SUMMARY

In one embodiment, the invention provides a method of updating an electronic device. The device has a non-volatile memory divided into at least three non-overlapping sections, a bootstrap image section, a updater image section, and a application image section. The method includes erasing the application image section of the non-volatile memory, receiving a firmware update, writing the firmware update into the application image section, rebooting the electronic device, determining one of an application program and an updater program resides in the application image section, executing the application program when the application program is determined to reside in the application image section, erasing the updater image section of the non-volatile memory when the updater program is determined to reside in the application image section, and moving the updater program from the application image section to the updater image section.

In another embodiment the invention provides an electronic device. The electronic device includes an interface, a non-volatile memory, and a controller. The interface is configured to communicate with a second device external to the electronic device. The a non-volatile memory has an application image section made up of a first writable block and an updater image section made up of a second writable block. The controller is coupled to the interface and the non-volatile memory and is configured to receive an updater program update from the interface and to write the updater program update into the application image section, to validate the updater program update written into the application image section, and to move the updater program update from the application image section to the updater image section.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
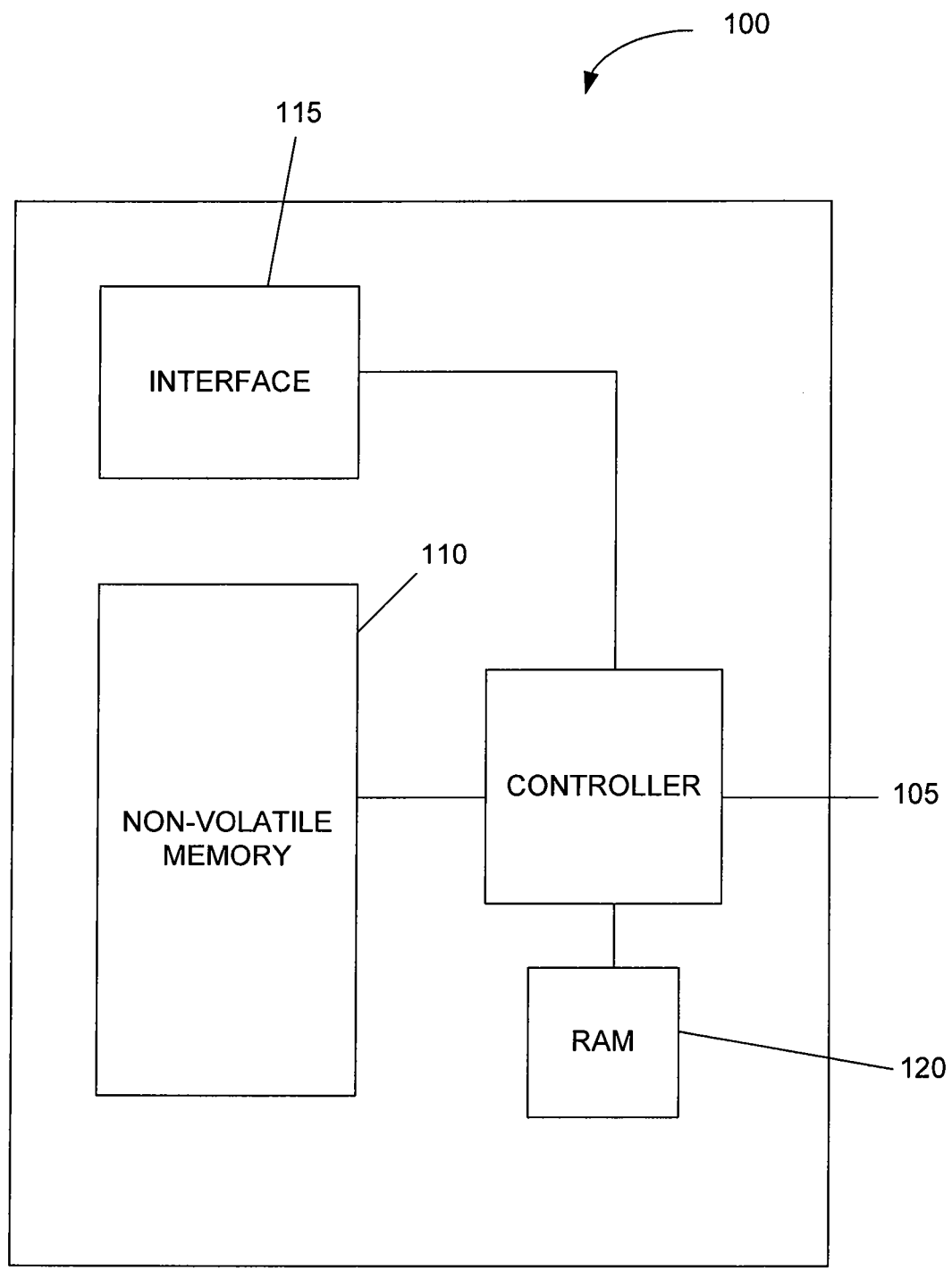
FIG. 1 is a block diagram of an embedded device.

FIG. 1 shows a block diagram of an embedded electronic device 100. The embedded device 100 includes a controller 105 (e.g., a microprocessor, a microcontroller, an ASIC, etc.), a non-volatile memory 110 (e.g., a flash memory, an electrically-erasable programmable read-only memory (EEPROM), etc.), an interface 115 (e.g., a wireless interface (WiFi, Bluetooth, etc.), a USB interface, etc.), and a random access memory 120 (RAM). The controller 100 communicates with devices external to the embedded device 100 via the interface 115, and executes programs stored in the memory 110. The controller 100 also writes data to the memory 110 (e.g., program updates). The memories 110 and 120 can be integrated into the controller 105 or can be separate components.

Figure 2:
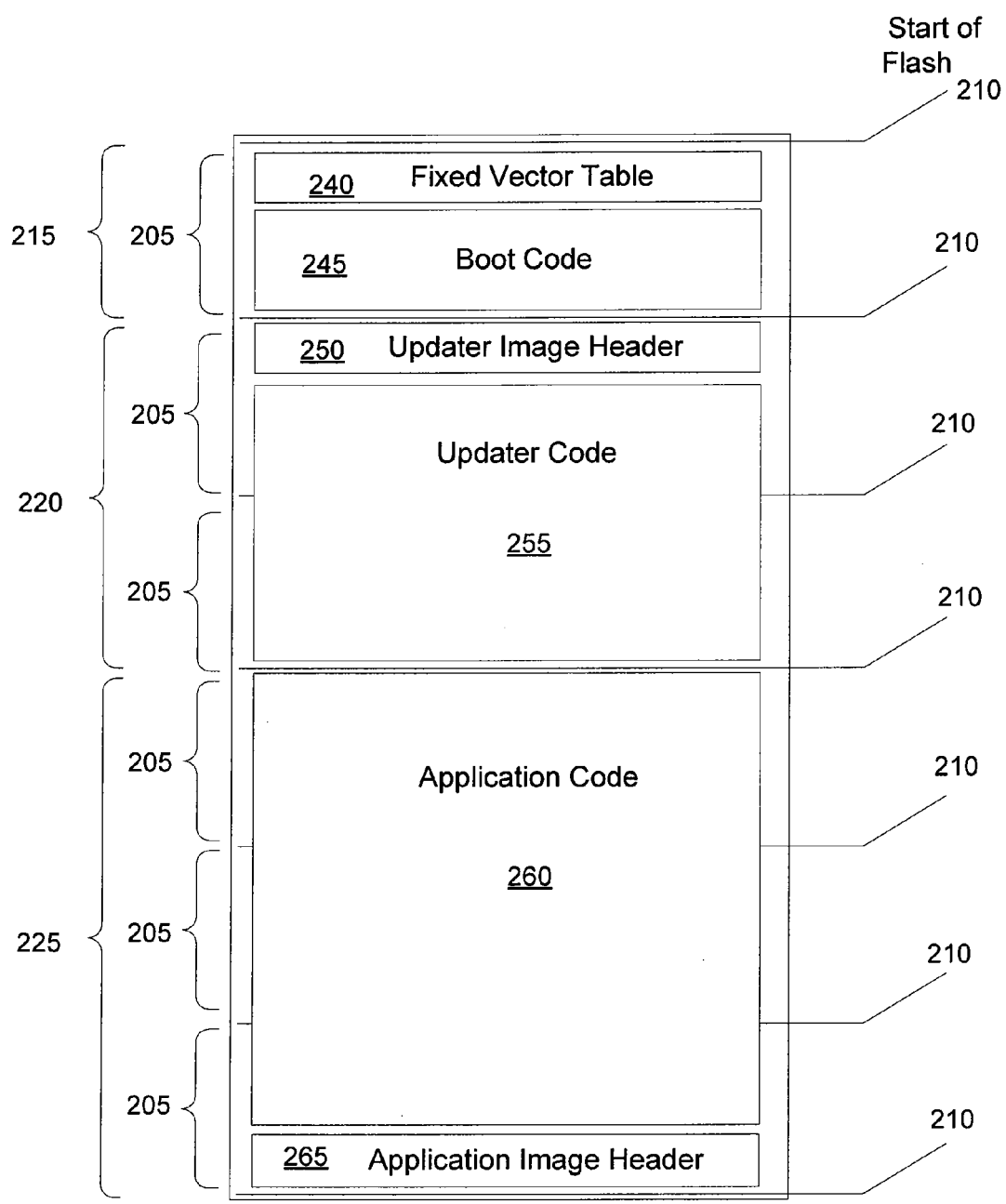
FIG. 2 is a memory map for a non-volatile memory of the embedded device of FIG. 1.

FIG. 2 shows a firmware structure 200 for the memory 110. The memory 110 includes a plurality of writable blocks 205. The start and end of each writable block 205 is referred to as a block boundary 210. The memory 110 includes a bootstrap image section 215, an updater image section 220, and an application image section 225. Each of the image sections 215-225 begin and end on block boundaries 230, and do not share any writable blocks 205 (i.e., are non-overlapping).

This design is applicable for a memory 110 with at least three blocks of erasable flash storage (i.e., writable blocks), or other block-based EEPROM storage. The embodiment shown includes six blocks 205.

One or more blocks 205 are assigned to the three image sections: the bootstrap image section 215, the updater image section 220, and the application image section 225. The images 215-225 can have any number of blocks 205, and some blocks 205 may be left unassigned. The only constraints are that the updater image section 220 is the same size or smaller than the application image section 225, and there must be at least three independently erasable blocks 205 (at least one block 205 for each of the three sections: the bootstrap image section 215, the updater image section 220, and the application image section 225).

Because each image section 215-225 begins and ends on a block boundary 230, any one image 215-225 can be erased without affecting any of the other images 215-225.

The bootstrap image section 215 contains a fixed reset vector table 240 and a bootstrap code section 245. The fixed reset vector table 240 is located at the start of the memory 110. In some embodiments, the fixed reset vector table 240 is located at the end of the memory 110. Upon start-up, the controller 105 accesses the fixed reset vector table 240 and obtains a vector or pointer to the start of a bootstrap program located in the bootstrap code section 245. As described below, the bootstrap program is an executable program that determines whether to execute a program located in the updater image section 220 or the application image section 225.

In the embodiment shown, the updater image section 220 begins on the block boundary 210 adjacent to the bootstrap image section 215, and begins with a updater header section 250 followed by an updater code section 255. The application image section 225 begins on a block boundary 210 adjacent the updater image section 220 with an application code section 260. Following the application code section 260 is an application header section 265 which ends at a block boundary 210. In the embodiment shown, the application header section 265 ends at the last block boundary 210 of the memory 110.

The updater header section 250 and the application header section 265 include flags to indicate whether a valid program exists in the updater code section 255 and the application code section 260 respectively. In addition, the updater header section 250 and the application header section 265 include pointers to the start of the respective programs for each code section 255 and 260.

In an alternate embodiment, the application image section 225 begins adjacent to the bootstrap image section 215, with the application header section 265, and the updater image section 220 ends with updater header section 250 at the end of the last storage block 205.

In some embodiments, one or more blocks 205 between or after the image sections 215-225 (e.g., between the updater image section 220 and the application image section 225) may be used for storing other data.

Figure 3:
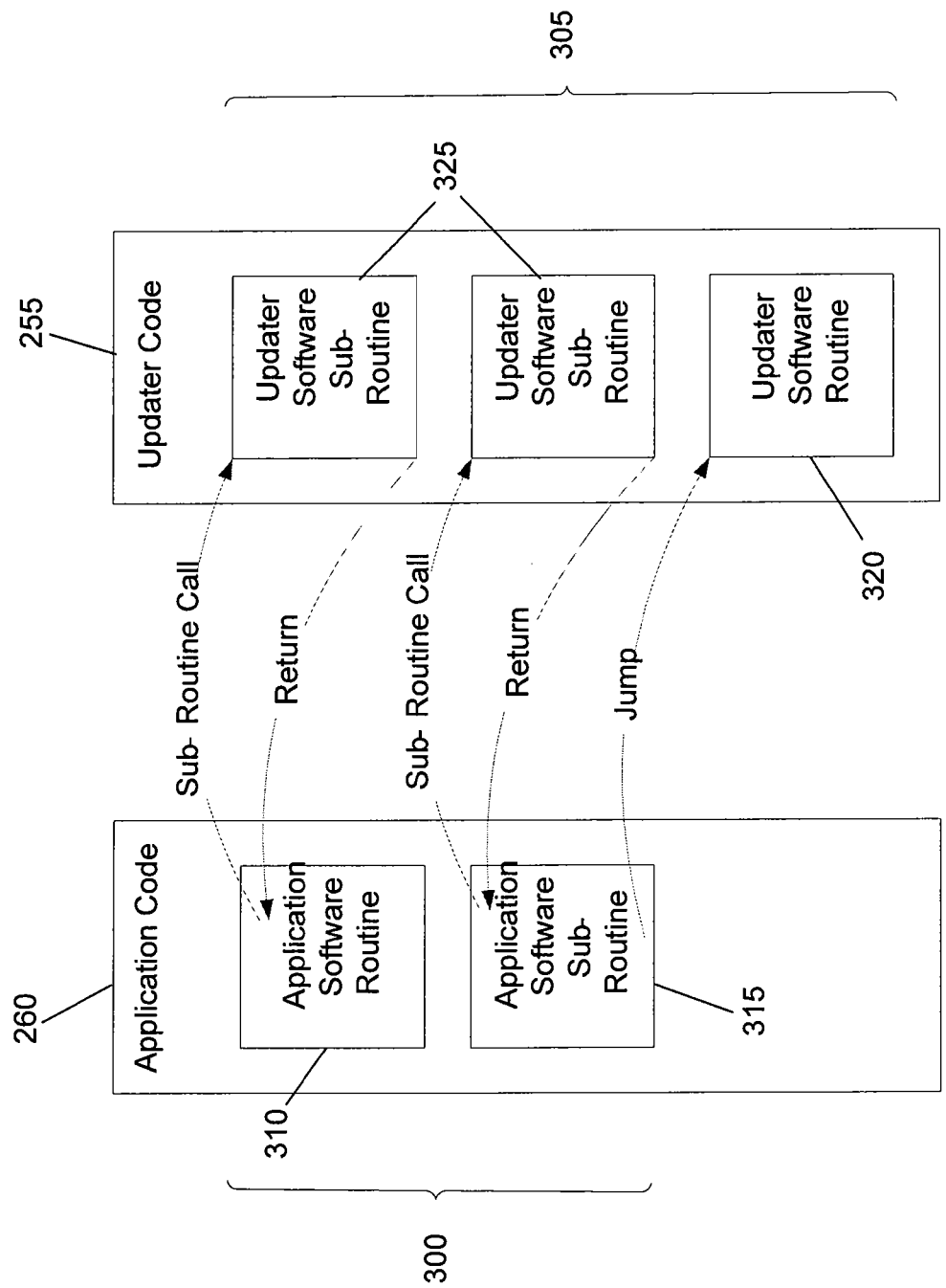
FIG. 3 is a diagram showing a relationship of an updater image to an application image.

FIG. 3 shows a relationship of an application program 300 located in the application code section 260 and an updater program 305 located in the updater code section 255. The application program 300 includes one or more application routines 310, and may include one or more application sub-routines 315. Similarly, the updater program 305 includes one or more updater routines 320, and may include one or more updater subroutines 325.

To reduce duplication of code between the application program 300 and the updater program 305, the application program 300 can use code in the updater program 305 by jumping to updater routines 320 and subroutines 320. The application program 300 can be statically linked to the updater program 305 (e.g., using a linker tool in a software development kit), or the application program 300 can be dynamically linked to the updater program 305 (e.g., exporting a table of interfaces that are read by the application program 300 to determine the specific addresses to call at run-time).

During updating of the updater program 305 (as described below), the application program 300 is erased. To enable the updater program 305 to run once the application program 300 is erased, the updater program 305 is not linked to the application program 300 (i.e., does not make calls into the application program 300).

Figure 4A:
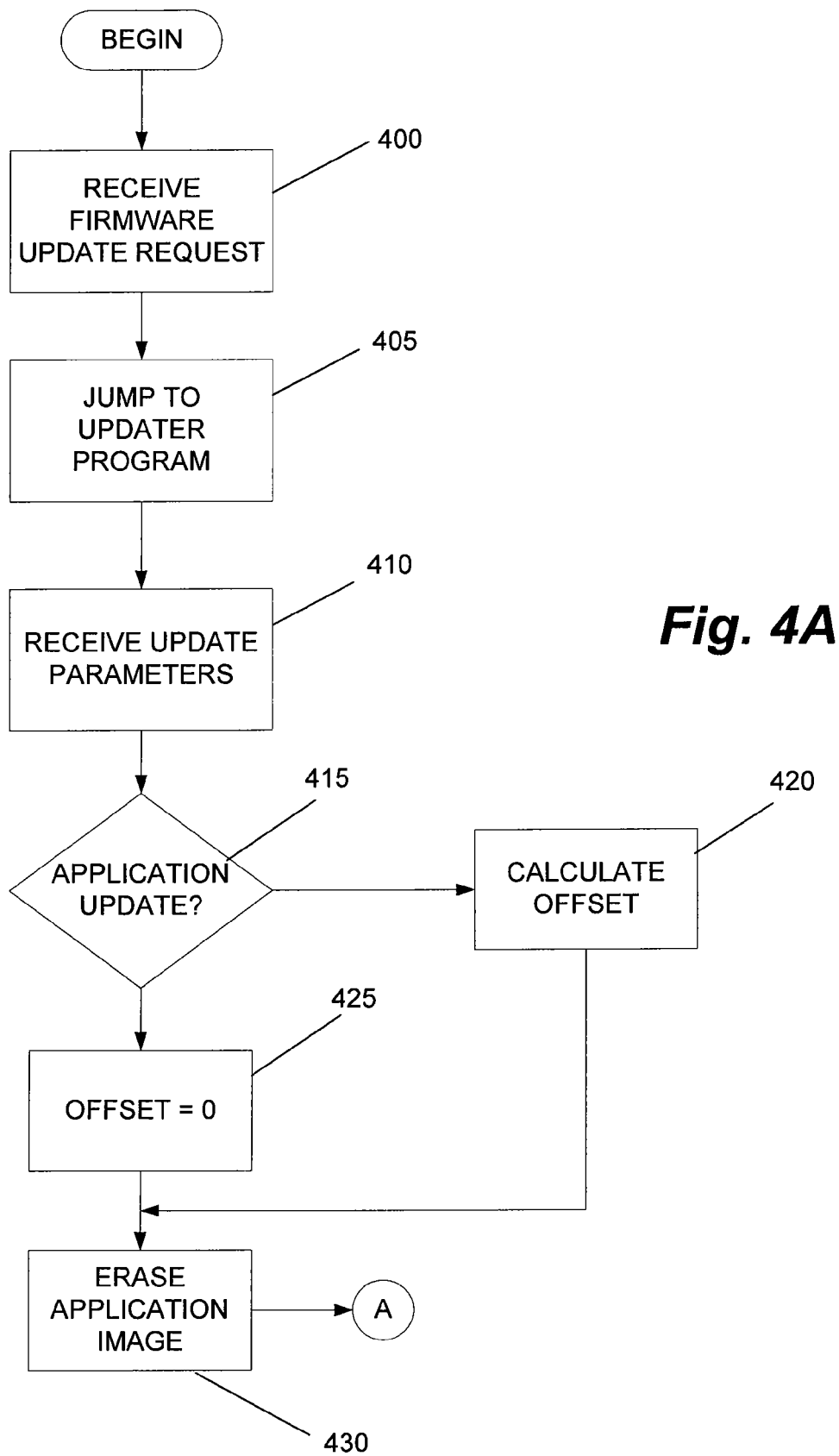
FIG. 4 is a flow chart of an operation of an updater program.
Figure 4B:
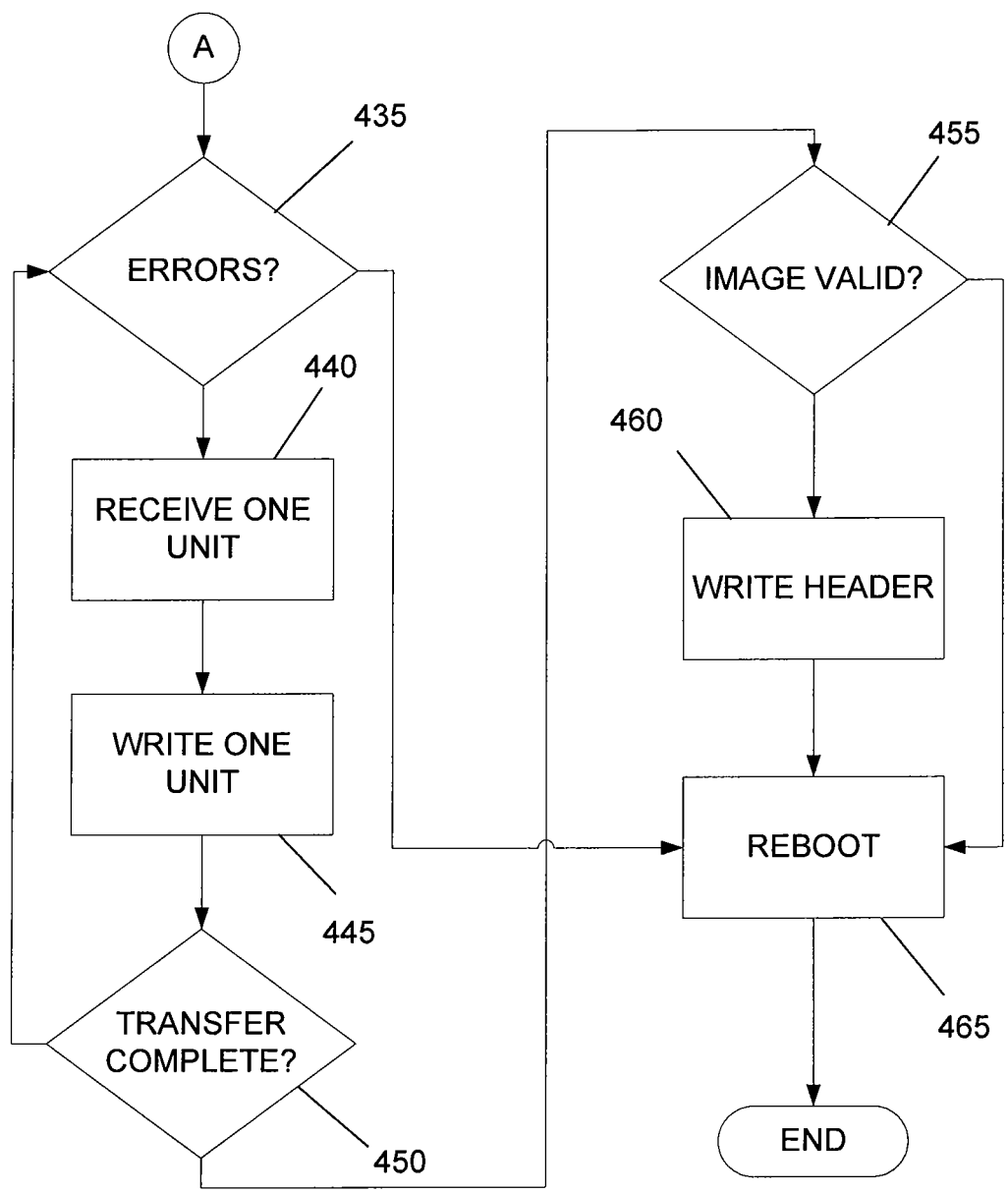

FIGS. 4A and 4B show a failsafe method for receiving updates of either the updater program 305 or the application program 300. To prevent the embedded device 100 from being unusable should an error occur during updating of the device 100 (e.g., a loss of power in the middle of an update), a new updater program 305 (including updater header information) is stored in the application image section 225, verified, and made active before the old updater program 305 is erased.

The method is initiated when the device 100 receives a request from a host or user to update the application program 300 or the updater program 305 (step 400). If the application program 300 is running when a firmware update request is received, a sub-routine in the updater program 305 is called to transfer all processing from the application program 300 to the updater program 305 (step 405). Next, update parameters are transferred from the host (e.g., wirelessly or via a removable media) (step 410). The update parameters include an indication of which program is being updated (e.g., the application program 300 or the updater program 305), a starting address of the program data, and a size of the data. The controller 105 then determines if the update is for the application program 300 or the updater program 305 (step 415). If the image address and size correspond to the updater program 305, an offset is calculated (step 420). This offset will be the amount by which the specified storage addresses must be modified to locate the received updater program 305 temporarily in the application image section 225.

If the image address and size correspond to the application program 300, an offset of zero is stored (step 425). If the request is valid, the application image section 225 is erased (step 430), providing enough empty storage to hold the data identified by the size parameter. The erase procedure will inherently mark the application header invalid. This prevents the application program 300 from being used if the device 100 reboots.

A loop then begins to transfer the program. As long as there are no errors, the loop continues until the transfer is complete. To prevent the application image from being used if the microprocessor reboots prior to the program being completely transferred and written, the transferred image header data (e.g., the updater image header 250 or the application image header 265) is cached instead of being directly written to the memory 110.

The controller 105 checks if there are any errors (i.e., validates the update) (step 435). If there are no errors, a unit of firmware is received from the host or removable media (step 440). This unit is a small amount of data that can be transferred and written efficiently. The size will depend on the transfer mechanism and specifics about the controller 105. It is conceivable that some systems may use a transfer unit as small as a single byte, or as large as the entire program. The controller 105 continues with writing the data to the application code section 260 of the memory 110 (step 445). Next the controller 105 checks if the transfer is complete (step 450). If the transfer is not complete, processing continues with checking for errors (step 435), receiving the next unit (step 440), and writing the unit (step 445).

Once the transfer is complete (step 450), the image is verified as written to the memory 110 (step 455). In the embodiment shown, this is done using an MD5 checksum. This is different than prior techniques in that the checksum is checked only after it is written to the memory 110, and not in an intermediate buffer prior to writing. In alternate embodiments, other techniques, such as CRC, are used for validation. An image header is then written to the application header section 265 from the cached data (step 460), and the device 100 is rebooted (step 465). If an error was detected (step 435), the device 100 is rebooted (step 465) which restarts the update process.

Figure 5:
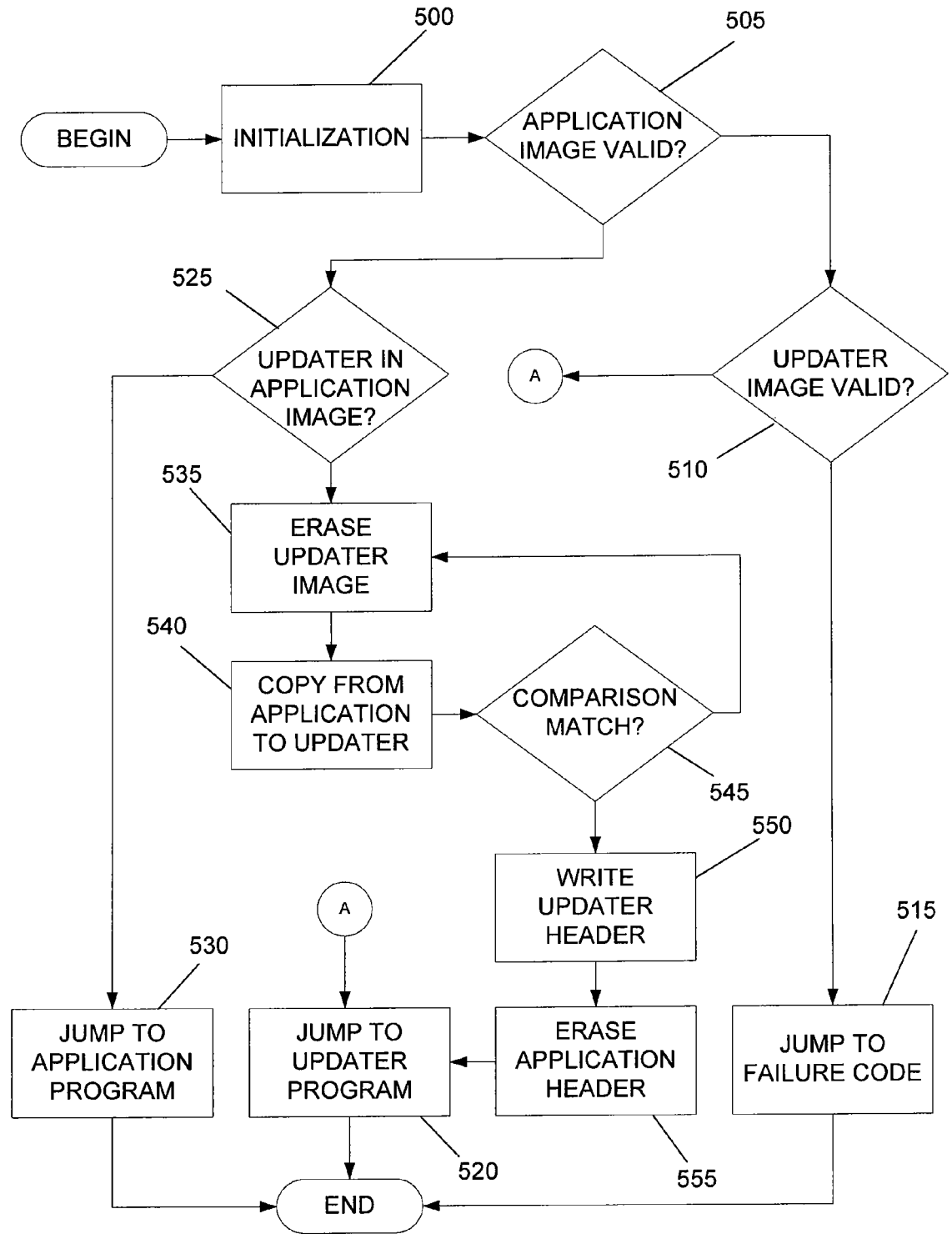
FIG. 5 is a flow chart of a start up operation of an embedded device.

FIG. 5 shows a method performed upon power-up or reboot of the embedded device 100. The method launches the application program 300, or copies a new updater program 305 from temporary storage in the application image section 225 and executes the new updater program 305.

To allow interrupts handled by the fixed vector table to be passed to either the program in the updater image section 220 or the program in the application image section 225, a vector table, mirroring the fixed vector table 240, is created in RAM 120. The bootstrap interrupt handlers jump to the handlers identified in the RAM 120 fixed vector table.

First, the controller 105 and memory 110 are initialized (step 500). Next, the application image section 225 is checked for validity (step 505). In some embodiments, this is a simple check of a flag value. If the application image section 225 is not valid (step 505), the updater image section 220 is checked for validity (step 510). In some embodiments, this is also a simple check of a flag value.

The application image section 225 is valid when a valid program (i.e., an application program 300 or an updater program 305 temporarily stored in the application image section 225) is valid and the application header section 265 is valid. The updater image section 220 is valid when an updater program 305 stored in the updater code section 255 is valid and the updater header section 250 is valid.

If the updater image section 220 is not valid, the device cannot boot. This situation can only be caused by a failure of a component of the device 100. In this case, the device 100 enters an error state (step 515) which may include an indication of the error state (e.g., a blinking LED). If the updater image section 220 is valid (and the application image section 225 was not valid at step 505), the controller 105 jumps to the updater program 305 in the updater image section 220 (step 520) and executes an update.

If the application image section 225 is valid (step 505), the application image header is further interrogated to determine if there is an updater program 305 stored temporarily in the application image section 225 (step 525). If the application image section 225 is holding a valid application program 300, the controller 105 jumps to the application program 300 (step 530).

If a valid updater program 305 is found in the application image section 225, the controller 105 erases the existing updater image section 220 (step 535). Should the device reboot from this point until the application image section 225 is erased, the controller 105 repeats the process.

The controller 105 then copies the updater program 305, temporarily stored in the application image section 225, to the updater image section 220 (step 540). The controller then does a byte-by-byte comparison (step 545) to ensure that the updater program 305 is properly copied. If the byte-by-byte comparison does not match, the erase (step 535) and copy (step 540) is repeated. If the byte-by-byte comparison matches (step 545), the updater image header is written to the updater header section 250 from the cache (step 550). In other embodiments, other validation methods are employed such as check-sum, CRC, etc.

Next, the application header section 265 is erased (step 555). This prevents the erase/copy process (steps 535 and 540) from recurring should a reboot occur.

The controller 105 then jumps to the updater program 305 (step 520), and executes an update to obtain a new copy of the application program 300.

Thus, a valid updater program 305 always exists; either in the updater image section 220 or the application image section 225, ensuring that the device 100 can always operate, even should an error (e.g., a device 100 reboot or an interruption of an update) occur during an update.

Various features and advantages of the invention are set forth in the following claims.

What is claimed is:

1. A method of updating an electronic device having a non-volatile memory divided into at least three non-overlapping sections, a bootstrap image section, a updater image section, and an application image section, the method comprising:
   erasing the application image section of the non-volatile memory;
   receiving a firmware update;
   writing the firmware update into the application image section, the firmware update including one of an application program and an updater program;
   rebooting the electronic device;
   determining whether the firmware update written into the application image section is an application program or an updater program;
   executing the program residing in the application image section when the firmware update written into the application image section is determined to be an application program;
   erasing the updater image section of the non-volatile memory when the firmware update written into the application image section is determined to be an updater program;
   moving the firmware update updater program from the application image section to the updater image section and obtaining a new application program after moving the updater program from the application image section to the updater image section.

2. The method of claim 1, further comprising validating the firmware update in the application image section after writing the firmware update into the application image section and before rebooting the electronic device.

3. The method of claim 2, further comprising writing an application image header after the firmware update is validated and before rebooting the electronic device.

4. The method of claim 3, wherein an updater image header is erased after the application image header is written and validated, if the firmware update is an updater program update.

5. The method of claim 1, further comprising validating the updater program in the updater image section after moving the updater program from the application image section to the updater image section.

6. The method of claim 5, further comprising writing an updater image header and erasing an application image header after the updater program in the updater image section has been validated.

7. The method of claim 1, wherein the application program calls routines in the updater program.

8. The method of claim 1, wherein the updater program does not call routines in the application program.

9. An electronic device, the electronic device comprising:
an interface configured to communicate with a second device external to the electronic device;
a non-volatile memory having
an application image section made up of a first writable block and containing an application program, and
an updater image section made up of a second writable block and containing an updater program; and
a controller coupled to the interface and the non-volatile memory and configured to receive an updater program update from the interface and to write the updater program update into the application image section after erasing the application program, to validate the updater program update written into the application image section, to move the updater program update from the application image section to the updater image section after erasing the updater program and obtaining a new application program after moving the updater program from the application image section to the updater image section.

10. The electronic device of claim 9, wherein the non-volatile memory includes a bootstrap image section, the bootstrap image section having a bootstrap program for determining if a valid program exists in the updater image section and the application image section.

11. The electronic device of claim 10, wherein the bootstrap program executes a program in the application image section when a valid program exists in the application image section.

12. The electronic device of claim 10, wherein the bootstrap program executes a program in the updater image section when a valid program does not exist in the application image section.

13. The electronic device of claim 9, wherein the controller is configured to obtain a new application program after moving the updater program from the application image section to the updater image section.

14. The electronic device of claim 9, wherein the controller is configured to validate the updater program in the updater image section after moving the updater program from the application image section to the updater image section.

15. The electronic device of claim 14, wherein the controller is configured to write an updater image header and erase an application image header after the updater program in the updater image section has been moved to the updater image section and validated.

* * * * *